P. BROWN.
Soldering Furnace.
No. 14,008.
Patented Jan. 1, 1856.
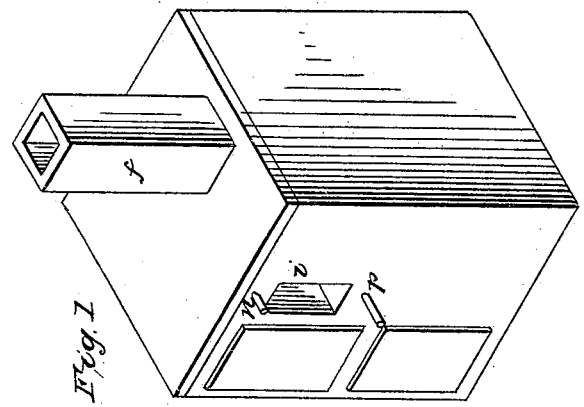
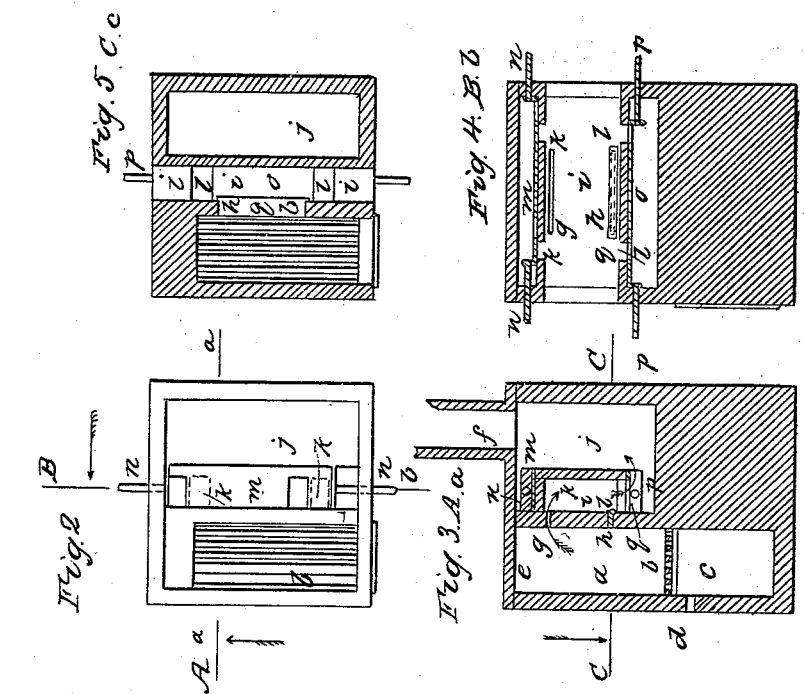

UNITED STATES PATENT OFFICE.

PHILO BROWN, OF WATERBURY, CONNECTICUT.

IMPROVEMENT IN FURNACES FOR SOLDERING.

Specification forming part of Letters Patent No. 14,008, dated January 1, 1856.

*To all whom it may concern:*

Be it known that I, PHILO BROWN, of Waterbury, in the State of Connecticut, have made a new and useful Improvement in the Furnace for Brazing or Soldering Brass and other Metallic Tubes; and I do hereby declare that the following is a full, clear, and exact description thereof, reference being had to the accompanying drawings, making part of this specification, in which—

Figure 1 is a perspective view of my improved furnace; Fig. 2, a top view with the cap of the furnace removed; Figs. 3 and 4, vertical sections taken at the lines A *a* and B *b* of Fig. 2, and Fig. 5 a horizontal section taken at the line C *c* of Fig. 3.

The same letters indicate like parts in all the figures.

In brazing or soldering brass tubes it has heretofore been the universal practice to place the tubes in a furnace with the seam to be brazed or soldered above, that the brazing or soldering may rest on the top of the seam, and then to apply the heat from below, so that the lower part of the tubes are exposed to a much more intense heat than the upper part, where the heat is mainly required. In consequence of this the metal of the tubes is frequently injured.

My invention relates to the construction of furnaces to avoid the difficulties above pointed out in the brazing or soldering of tubes; and my said invention consists in combining with the fire-chamber of a furnace a chamber in which the tubes to be brazed or soldered are to be placed to be heated, when the said brazing-chamber is interposed between the fire-chamber and the chimney and controlled by dampers, so that at the option of the operator the flame and heated products of combustion can be made to enter such chamber either above the tubes to be brazed or soldered or below such tubes, whereby such tubes can be brazed or soldered by placing the brazing or soldering outside or inside of such tubes without the danger of either loosing the brazing or soldering or of overheating the metal of the tubes.

In the accompanying drawings, *a* represents a fire-chamber, with a grate, *b*, and ash-pit *c* below, and a draft-hole, *d*, in front and below the grate, for the admission of air to the fuel. The upper part of this fire-chamber is closed, as at *e*, so that the products of combustion to reach the chimney *f* must pass through one of two horizontal openings, *g h*, in the rear wall, which openings pass through to a brazing-chamber, *i*, back of this wall. The opening *g* enters the brazing-chamber near the top, and the other opening, *h*, enters the said chamber near the bottom. This brazing-chamber is formed in a compartment, *j*, which communicates with the chimney *f*, and through the top and bottom of this brazing-chamber there are apertures *k k* and *l l*, the apertures *k k* at top being governed by a damper, *m*, on a sliding rod, *n*, and the apertures *l l* at the bottom governed by a damper, *o*, on a sliding rod, *p*. Either of the horizontal openings *g h* leading from the fire-chamber to the brazing-chamber can be closed at pleasure by a block or blocks, *q*, of fire-brick simply inserted in such openings. The brazing-chamber is open at each end, as represented in the drawings, so that the tubes can be inserted at one end and passed through as the brazing progresses. If the tube is to be brazed or soldered on the outside, the brazing or soldering is put on the seam, and the tube is inserted in the brazing-chamber with seam uppermost, so that the brazing or soldering will not roll off, and then the opening *h*, leading to the brazing-chamber, is closed and the one *g* opened, which admits the products of combustion into the upper part of the chamber, and the damper *m* is pushed to close the apertures *k k* at the top of the chamber, and the damper *o* to open the apertures *l l* at the bottom. In this way it will be seen that the heated products of combustion pass downward through the brazing-chamber, acting directly on the top of the tube, and therefore imparting the most intense heat to the part which is to be brazed or soldered, and less to the parts of the tubes which are not to be brazed, and when the tube is to be brazed or soldered from the inside the brazing or soldering is laid along over the seam on the inside of the tube, which is inserted in the brazing-chamber with the seam downward and resting on a brick at each end of the chamber to elevate it above the bottom of the chamber, in which case the dampers are reversed and the opening *g* is closed and the one *h* opened, by which the heated products are made to enter the brazing-chamber at the bottom and escape at the top, so that the most intense heat will be applied to the lower part of the tube where the brazing or soldering is to be effected. In this way, whether the tubes are to be brazed inside or outside, the heat can be directed to the seam, and thus avoid all danger of overheating the metal of the tubes, which has heretofore been of frequent occurrence.

I do not limit myself to the form, construction, or proportion of the parts, as these may be varied without changing the principle or mode of operation of my invention.

I am aware that it has been suggested to avoid the difficulties experienced in the old mode of brazing or soldering metallic tubes herein referred to by placing the tubes in a chamber or passage between the fire-chamber and chimney-flue through which the flame and other products of combustion pass horizontally or nearly so; but this would not and could not effect the purpose contemplated by me, as that side of the tube to be brazed or soldered nearest the fire-chamber would unavoidably be heated to a higher temperature than the top or bottom, and therefore I wish it to be understood that I do not claim, broadly, the construction or use of a furnace for brazing or soldering metallic tubes consisting of a brazing or soldering chamber or passage interposed between the fire-chamber and chimney-flue.

What I claim as my invention, and desire to secure by Letters Patent, is—

Combining the brazing or soldering chamber with the fire-chamber and chimney and interposed between the two, when the said brazing or soldering chamber communicates with the fire-chamber by means of one or more apertures at or near the top and one or more apertures at or near the bottom, and with the chimney by one or more apertures at or near the top and one or more apertures at or near the bottom, governed by dampers or equivalents therefor, substantially as and for the purpose specified.

PHILO BROWN.

Witnesses:
A. L. FINCH,
A. P. BROWNE.